Inventor:
Hans Jensen
By: Cox & Moore
attys

Patented July 23, 1940

2,209,085

UNITED STATES PATENT OFFICE 2,209,085

SEAL FOR ROTATING SHAFTS

Hans Jensen, Chicago, Ill., assignor to Rotary Seal Co., Chicago, Ill., a corporation of Illinois Application October 21, 1936, Serial No. 106,843

8 Claims. (Cl. 286—11)

My invention relates in general to seals and sealing, and has more particular reference to the provision of means for sealing rotating shafts to prevent the escape of fluids along the shaft past a wall or journal in which the shaft extends.

An important object of the present invention is to provide an improved seal of simplified construction and unusually efficient operating characteristics.

Another important object is to provide a seal having an improved resilient packing element, including movable means for securing the packing element on a shaft to be sealed.

Another important object is to provide a packing element of resilient material and having a diaphragm action in order to maintain an efficient sealing effect at all times during the operating life of the seal.

These and numerous other important objects, advantages, and inherent functions of the invention will be fully understood as the same becomes apparent from the following description, which, taken in connection with the accompanying drawing, discloses a preferred embodiment of the invention.

Referring to the drawing.

Figure 1:
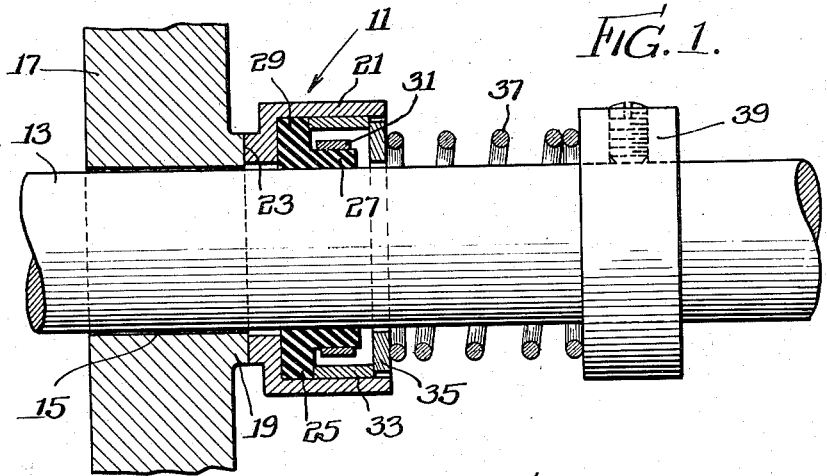
Figure 1 is a sectional view taken through a seal embodying the present invention, the seal being shown as assembled in operating position on a shaft to be sealed.
Figure 2:
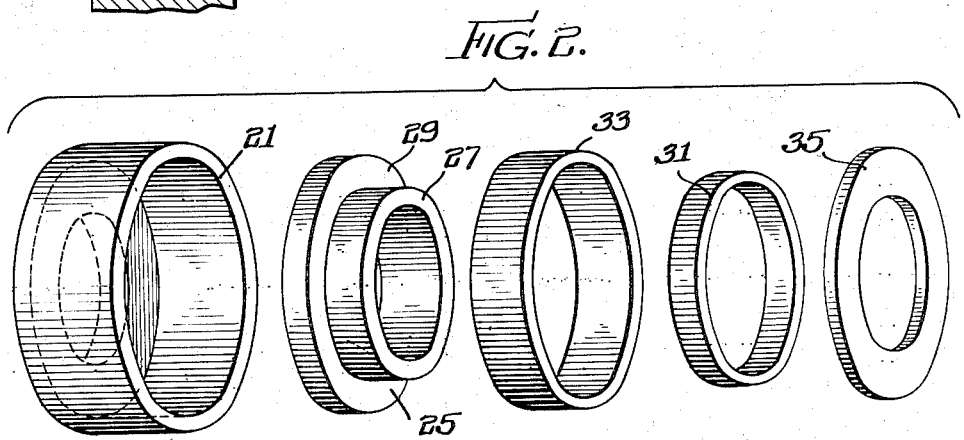
Figure 2 is a perspective view of the several parts forming the seal shown in Figure 1.

To illustrate the invention, I have shown on the drawing shaft seals 11, particularly adapted for use on rotating shafts 13 for sealing the same against leakage along the shaft through an opening 15 in a wall 17 through which the shaft extends. This opening 15 may, of course, comprise a shaft bearing.

Figures 3, 4:
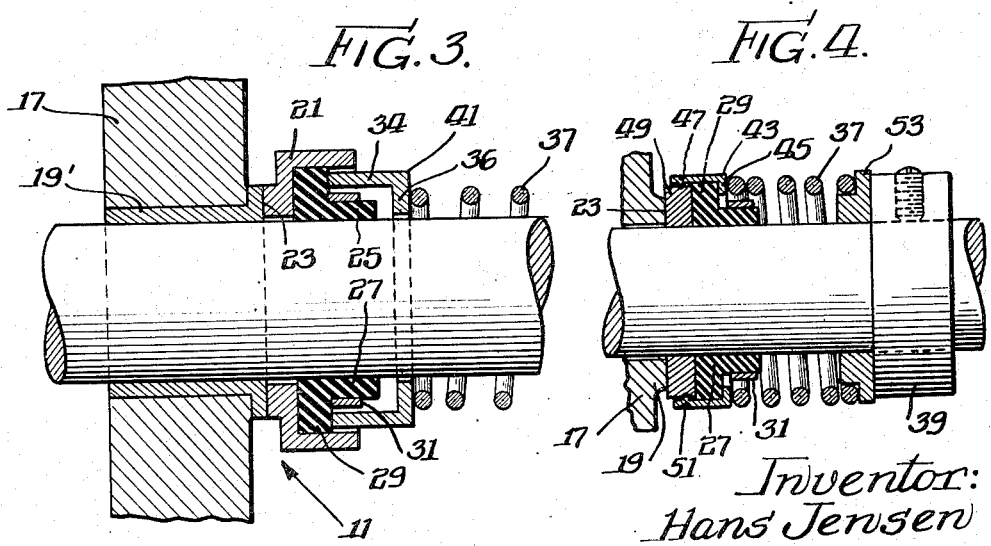
Figure 3 is a sectional view illustrating a modified form of the seal.
Figure 4 is a sectional elevation of a second modified form of the seal.

The wall 17 may be and preferably is formed with an embossment 19 providing an annular bearing surface surrounding the shaft opening 15 and this embossment may, of course, be formed integral with the wall 17, as shown in Figure 1, or may be formed as a part of a removable bushing or insert 19', as shown in Figure 3.

The seal 11 comprises an annular cup-shaped element 21 adapted for assembly around the shaft to be sealed and having a bearing surface 23 adapted to engage upon the bearing surface of the embossment 19 to form a running fit therewith. Within the cup-shaped element 21 is arranged a packing element 25 preferably formed of resilient rubber-like material, and I prefer to utilize a synthetic rubber, such as "Duprene," as a sealing material. The element 25 comprises a cylindrical portion 27 adapted to snugly engage the surfaces of the shaft 13 on which it is mounted. The cylindrical portion 27 at one end is formed with an outstanding flanged portion 29 of a size such that the peripheral edges of the flange 29 may fit snugly within and engage the inner surfaces of the side walls of the cup-shaped element 21, the end face of the element 25 being adapted to engage the bottom of the cup-shaped element. I also provide a holding ring 31 preferably comprising an annular or cylindrical band of steel or other suitable material. This holding ring is assembled upon the cylindrical portions 27 of the packing element and serves to hold the medial portions thereof snugly upon the shaft 13.

The packing element 25 is held in the cup-shaped element 21 in any suitable fashion and may preferably be secured therein, either by resilient means or in relatively fixed relationship.

The embodiment shown in Figure 1 comprehends the use of a cylindrical collar element 33 adapted to make a tight press fit within the annular walls of the cup-shaped element 21. Thus, after the packing element has been positioned as shown in Figure 1, the collar element 33 is forcefully slid within the element 21 to engage the flanged portion 29 at the peripheral edges thereof. The collar may be adjusted manually to press with the desired force against the said flanged portion and will be functionally held in this position against all normal, unauthorized stresses.

A presser disc 35 is provided around the shaft 13 in position to engage and press upon the end of the collar element 33 and a helical spring 37 bearing at one end on the presser disc 35 and at the other end on means forming an abutment 39 on the shaft 13 is provided to supply the requisite force to maintain the seal in position against the embossment.

Alternatively, a spring or other suitable resilient arrangement may be provided to normally urge the element 25 axially along the shaft 13 and press the same into the cup.

Referring to Figure 3, the collar 33 and presser disc are replaced by a member 41 having a collar portion 34 and presser disc portion 36 formed integrally and having a cup-shaped configuration. The collar portion 34, however, is provided with ample clearance to fit readily within the side walls of the cup member and press resiliently against the flange portion of the packing element 25.

According to this arrangement, the seal urging means comprising the spring and abutment on the shaft, not only serves to hold the cup-shaped element 21 in position engaging the flange portion of the sleeve 19 at the plane 23, but also is adapted to resiliently urge the element 25 into the cup 21 and thereby resiliently maintain it in position.

The abutment 39 may comprise a separate collar positioned on, and anchored to, the shaft in any suitable fashion as by the set screws shown, or it may be a part of, and formed integrally on, the shaft 13.

It will be obvious that the collar 33 in Figure 1 might, if desired, be so constructed as to fit relatively loosely within the cup member 21 or in like manner, the collar portion 34 of the integral collar and presser disc, as shown in Figure 3, might be so proportioned as to provide a "force fit" in the manner of the collar 33. Likewise, such a collar is not necessarily limited to this manner of securement with relation to the cup member, but may be held by any convenient means such as mutually engaging portions, set screws and the like.

In the embodiment of Figure 3, the spring 37 operates through the presser elements 41 to press the packing element 25 within the cup-shaped element 21 and in both embodiments the elements 33 or 34 operate to keep the cup-shaped element 21 in firm sealing engagement with the embossment 19. While the pressing force is applied at the marginal edges of the flanged portion 29 of the packing element, the cylindrical portions 25 of said element naturally assume a position on the shaft substantially as shown in the drawing. In fact, the parts are preferably initially assembled in such position. The cylindrical portions 25 of the packing elements form a snug engagement upon the surfaces of the shaft, which engagement extends throughout the length of the cylindrical portions 25. Any leakage of fluid along the shaft through the opening 15 toward the seal will be blocked by the seal due to the snug running fit maintained by the spring 37 between the cooperating bearing surfaces of element 21 and the embossment 19; and escape of fluid is blocked along the shaft between it and the sealing element by the snug engagement of the element 25, it being understood that the sealing element rotates with the shaft and is contracted tightly thereon. The edges of the sealing element are pressed by the edge of the collar 33 or 34 within the cup-shaped element so that leakage of fluid between said elements is also prevented, it being understood that the sealing element and the cup-shaped element rotate together so that there is no chance of wear of the sealing element.

Should the shaft 13 move axially toward the left, viewing either Figure 1 or 3, the sealing fit between the element 25 and the shaft as well as between the elements 21 and 25 will be increased. If, however, the shaft when in operation may have movement toward the right, viewing Figures 1 and 3, the flange 29 will have a diaphragm action whereby the sealing effect is maintained. This diaphragm action is exerted in the flange 29, the outer edges of which, of course, are pressed at all times by the collar 33 or 34 in the cup-shaped member, the diaphragm being caused by movement of the cylindrical portions 27 of the sealing element with the shaft. The holding ring 31, however, when the flange 29 is acting as a diaphragm, will serve to hold the cylindrical portions 25 of the packing element snugly upon the shaft and maintain the sealing engagement thereof with the shaft. If the shaft remains in position displaced toward the right, viewing Figures 1 and 3, for any extended period, the resilience of the packing material, together with the force exerted by the flexing of the flange 29, will cause the cylindrical portions to creep in a direction to return the sealing element to its normal position without, however, at any time sacrificing sealing efficiency.

A further preferred embodiment is disclosed in Figure 4, wherein a cup-shaped member 43 is positioned over the flanged portion 29 of the packing element 25 but in the generally reverse direction than the cup-shaped element shown in Figure 3.

The cup-shaped member 43 has a radially extending flange 45 at one end adapted to more or less snugly enclose the peripheral edge of the packing element. The outer wall 47 enclosing the periphery of the packing element extends therebeyond toward the wall 17. A bearing ring 49 is positioned in the aperture formed by the wall portion 47 and in use abuts the bearing surface 23. The ring 49 may be held in the position shown in Figure 4 by any suitable means which will resist rotation.

In the drawing, inwardly deformed or detent portions 51 in the wall 47 of the cup-shaped member are adapted to engage corresponding depressions or slots in the ring. Thus, when these members are assembled, the depressed portions 51 tend to fix the ring against rotation relative thereto by engaging the periphery thereof. A shoulder element 53 serves to position and seat the end of the spring 37. It will thus be apparent that in operation the spring 37 will press forcefully upon the inwardly extending flange 45, thus applying force upon the outer edges of the packing element, and forcing the cup-shaped member 43, the packing element and the ring 49 as a unit into forceful bearing contact with the bearing surface 23.

The bearing ring 49 may be of any high grade bearing metal suitably selected to provide an anti-friction and leak-proof surface when pressed against a boss formed on the wall 17. Employing this construction it is not necessary, therefore, to machine in complicated form any relatively costly bearing composition since only the ring 49, which is of obviously simple structure, need be so constituted. In assembly the ring is merely slipped into the position shown in Figure 4 in which it is held by the opposed detents 51.

Moreover, it is possible to employ a wall bushing, for instance, as the bushing 19' shown in Figure 3. When employing such a structure, the bushing likewise may be made of some suitable high grade bearing metal which would properly co-act with the ring 49. To illustrate, if a bushing made of high grade bearing bronze was inserted in position in the wall, then the ring 49 might comprise any desired grade of bearing steel. Proper combinations of metals can readily be selected by those skilled in the art.

It is thought that the invention and its numerous attendant advantages will be fully understood from the foregoing description, and it is obvious that numerous changes may be made in the form, construction and arrangement of the several parts without departing from the spirit and the scope of the invention or sacrificing its attendant advantages, the form herein described being preferred embodiments for the purpose of illustrating the invention.

What I claim is new and desire to secure by Letters Patent of the United States is:

1. A seal for a cylindrical element such as a shaft and a wall member in which it extends, comprising an annular seal element adapted for assembly on the shaft, resilient sealing means having a sleeve-like portion adapted to frictionally grip the shaft to drivingly engage and form a seal therewith and an outwardly extending flange portion adapted to engage the annular seal element, and means to hold the peripheral edges of said flange portion in sealing engagement upon the seal element, said flange portion being free to flex, inwardly of said peripheral portions, whereby to utilize the flexibility of the sealing means to accommodate relative axial movement of the shaft with respect to the seal element while maintaining sealing engagement of the sleeve-like and flange portions, respectively, on the shaft and on the seal element.

2. A seal for a cylindrical element such as a shaft and a wall member in which it extends, comprising an annular seal element adapted for assembly on the shaft, resilient sealing means having a sleeve-like portion adapted to frictionally grip the shaft to drivingly engage and form a seal therewith and an outwardly extending flange portion adapted to engage the annular seal element, means snugly embracing the sleeve-like portion to squeeze the same in sealing engagement on the surfaces of the shaft, and means to hold the peripheral edges of said flange portion in sealing engagement upon the seal element, said flange portion being free to flex, inwardly of said peripheral portions, whereby to utilize the flexibility of the sealing means to accommodate relative axial movement of the shaft with respect to the seal element while maintaining sealing engagement of the sleeve-like and flange portions, respectively, on the shaft and on the seal element.

3. A seal for a cylindrical element such as a shaft and a wall member in which it extends, comprising an annular seal element adapted for assembly on the shaft, resilient sealing means having a sleeve-like portion adapted to frictionally grip the shaft to drivingly engage and form a seal therewith and an outwardly extending flange portion adapted to engage the annular seal element, and a helical spring encircling the shaft and adapted to hold the peripheral edges of said flange portion in sealing engagement upon the seal element, said flange portion being free to flex, inwardly of said peripheral portions, whereby to utilize the flexibility of the sealing means to accommodate relative axial movement of the shaft with respect to the seal element while maintaining sealing engagement of the sleeve-like and flange portions, respectively, on the shaft and on the seal element.

4. A seal for a cylindrical element such as a shaft and a wall member in which it extends, comprising an annular cup-shaped seal element adapted for assembly on the shaft, resilient sealing means having a sleeve-like portion adapted to frictionally grip the shaft to drivingly engage and form a seal therewith and an outwardly extending flange portion adapted to extend within the annular cup-shaped seal element, and means to hold the peripheral edges of said flange portion in sealing engagement upon the seal element, said flange portion being free to flex, inwardly of said peripheral portions, whereby to utilize the flexibility of the sealing means to accommodate relative axial movement of the shaft with respect to the seal element while maintaining sealing engagement of the sleeve-like and flange portions, respectively, on the shaft and on the seal element.

5. A seal for a cylindrical element such as a shaft and a wall member in which it extends, comprising an annular seal element adapted for assembly on the shaft, resilient sealing means comprising an annular element of substantially L-shaped sectional configuration having a sleeve-like portion adapted to snugly embrace the shaft to form a seal therewith, and an annular flange adapted to sealingly engage the annular seal element at the marginal portions of said flange, said flange portion being free to flex, inwardly of said peripheral portions, whereby to utilize the flexibility of said flange, inwardly of the marginal portions thereof, as a diaphragm to accommodate relative axial movement of the shaft with respect to the seal element without destroying the sealing effect of the resilient sealing means on the shaft and on the seal element.

6. A seal for a cylindrical element such as a shaft and a wall member in which it extends, comprising an annular seal element adapted for assembly on the shaft, resilient sealing means having a sleeve-like portion adapted to frictionally grip the shaft to drivingly engage and form a seal therewith and an outwardly extending flange portion adapted to engage the annular seal element, and means to hold the peripheral edges of said flange portion in sealing engagement upon the seal element, said flange portion being free to flex, inwardly of said peripheral portions, whereby to utilize the flexibility of the sealing means to accommodate relative axial movement of the shaft with respect to the seal element while maintaining sealing engagement of the sleeve-like and flange portions, respectively, on the shaft and on the seal element, the means for holding the peripheral edges of the flange on said annular seal element comprising an annular bearing member adapted to encircle the shaft and having a rim formed to seat upon the marginal edges of said flange portion to press the same upon the annular seal element.

7. A seal for a cylindrical element such as a shaft and a wall member in which it extends, comprising an annular seal element adapted for assembly on the shaft, resilient sealing means having a sleeve-like portion adapted to frictionally grip the shaft to drivingly engage and form a seal therewith and an outwardly extending flange portion adapted to engage the annular seal element, and means to hold the peripheral edges of said flange portion in sealing engagement upon the seal element, said flange portion being free to flex, inwardly of said peripheral portions, whereby to utilize the flexibility of the sealing means to accommodate relative axial movement of the shaft with respect to the seal element while maintaining sealing engagement of the sleeve-like and flange portions, respectively, on the shaft and on the seal element, the means for holding the peripheral edges of the flange on said annular seal element comprising an annular bearing member adapted to encircle the shaft and having a rim formed to seat upon the marginal edges of said flange portion to press the same upon the annular seal element, and spring means operatively associated with said bearing means for urging the same axially on the shaft and into operative engagement with said flange portion.

8. A seal for a cylindrical element such as a shaft and a wall member in which it extends, comprising an annular seal element adapted for assembly on the shaft, resilient sealing means having a sleeve-like portion adapted for snug assembly around the shaft to form a seal therewith and an outwardly extending flange portion adapted to engage the annular seal element, and a helical spring encircling the shaft and adapted to hold the peripheral edges of said flange portion in sealing engagement upon the seal element, said flange portion being free to flex, inwardly of said peripheral portions, whereby to utilize the flexibility of the sealing means to accommodate relative axial movement of the shaft with respect to the seal element while maintaining sealing engagement of the sleeve-like and flange portions, respectively, on the shaft and on the seal element, said spring means serving also to urge the seal element axially on the shaft in a direction to seat the same upon the wall member.

HANS JENSEN.